United States Patent
Boni et al.

(10) Patent No.: US 11,080,317 B2
(45) Date of Patent: Aug. 3, 2021

(54) CONTEXT-AWARE SENTENCE COMPRESSION

(71) Applicant: International Business Machines Corporation, Armonk, NY (US)

(72) Inventors: Odellia Boni, Giv'vat Ela (IL); Doron Cohen, Mobile Misgav (IL); Guy Feigenblat, Givattaim (IL); David Konopnicki, Haifa (IL); Haggai Roitman, Yoknea'm Elit (IL)

(73) Assignee: International Business Machines Corporation, Armonk, NY (US)

( * ) Notice: Subject to any disclaimer, the term of this patent is extended or adjusted under 35 U.S.C. 154(b) by 40 days.

(21) Appl. No.: 16/505,749

(22) Filed: Jul. 9, 2019

(65) Prior Publication Data

US 2021/0011937 A1    Jan. 14, 2021

(51) Int. Cl.
*G06F 16/34* (2019.01)
*G06F 16/33* (2019.01)
*G06F 16/383* (2019.01)
*G06F 16/31* (2019.01)
*G06F 40/253* (2020.01)

(52) U.S. Cl.
CPC ......... *G06F 16/345* (2019.01); *G06F 16/322* (2019.01); *G06F 16/3331* (2019.01); *G06F 16/383* (2019.01); *G06F 40/253* (2020.01)

(58) Field of Classification Search
None
See application file for complete search history.

(56) References Cited

U.S. PATENT DOCUMENTS

| | | | | |
|---|---|---|---|---|
| 8,402,369 | B2 * | 3/2013 | Zhu | G06F 16/345 |
| | | | | 715/254 |
| 10,019,525 | B1 * | 7/2018 | Boni | G06F 16/90332 |
| 10,127,323 | B1 * | 11/2018 | Boni | G06F 16/345 |
| 10,628,474 | B2 * | 4/2020 | Modani | G06F 16/345 |

(Continued)

OTHER PUBLICATIONS

Knight, Kevin et al. "Summarization beyond sentence extraction: A probabilistic approach to sentence compression", Elsevier. (Year : 2002).*

(Continued)

*Primary Examiner* — Kavita Stanley
*Assistant Examiner* — Tyler Schallhorn
(74) *Attorney, Agent, or Firm* — Dvir Gassner

(57) ABSTRACT

A method comprising receiving digital documents, a query statement, and a summary length constraint; identifying, for each of said digital documents, a sentence subset, based, at least in part, on said query statement, a modified version of said summary length constraint, and a first set of quality objectives; generating, for each of said sentence subsets, a random forest representation; iteratively (i) sampling, from each of said random forest representations, a plurality of tokens to create a corresponding candidate document summary, based, at least in part, on weights assigned to each of said tokens, (ii) assigning a quality ranking to said candidate document summary, based, at least in part, on said first set of quality objectives and a second set of quality objectives, and (iii) adjusting said weights, based, at least in part, on said quality rankings; and outputting a highest ranking said candidate document as a compressed summary.

20 Claims, 9 Drawing Sheets

(56) References Cited

U.S. PATENT DOCUMENTS

| | | | | |
|---|---|---|---|---|
| 10,831,806 | B2* | 11/2020 | Feigenblat | G06F 16/93 |
| 10,949,452 | B2* | 3/2021 | Srinivasan | G06F 16/338 |
| 2009/0300486 | A1* | 12/2009 | Zhu | G06F 16/345 |
| | | | | 715/254 |
| 2013/0246386 | A1 | 9/2013 | Gherman et al. | |
| 2015/0339288 | A1 | 11/2015 | Baker et al. | |
| 2018/0011931 | A1* | 1/2018 | Modani | G06F 40/211 |
| 2018/0365323 | A1* | 12/2018 | Doornenbal | G06F 16/335 |
| 2019/0205395 | A1* | 7/2019 | Bonin | G06F 16/345 |
| 2020/0065346 | A1* | 2/2020 | Boni | G06F 16/93 |
| 2020/0134091 | A1* | 4/2020 | Feigenblat | G06F 16/345 |

OTHER PUBLICATIONS

Zajic, David M. et al. "Sentence Compression as a Component of a Multi-Document Summarization System", NIST. (Year: 2006).*

Dunlavy, Daniel M. et al. "QCS: A system for querying, clustering and summarizing documents", Elsevier. (Year: 2007).*

Zajic, David et al. "Multi-candidate reduction: Sentence compression as a tool for document summarization tasks", Elsevier. (Year: 2007).*

Martins, André F. T. et al. "Summarization with a Joint Model for Sentence Extraction and Compression", Association for Computational Linguistics. (Year: 2009).*

John, Ansamma et al. "Random Forest Classifier Based Multi-Document Summarization System", IEEE. (Year: 2013).*

Li, Chen et al. "Improving Multi-documents Summarization by Sentence Compression based on Expanded Constituent Parse Trees ", Association for Computational Linguistics. (Year: 2014).*

Wang, Lu et al. "A Sentence Compression Based Framework to Query-Focused Multi-Document Summarization", Association for Computational Linguistics. (Year: 2016).*

Feigenblat, Guy et al. "Unsupervised ery-Focused Multi-Document Summarization using the Cross Entropy Method", ACM. (Year: 2017).*

Feigenblat, Guy et al. "Summlt: A Tool for Extractive Summarization, Discovery and Analysis", ACM. (Year: 2017).*

Hovy, Eduard et al. "A BE-based Multi-document Summarizer with Sentence Compression", 2005. <https://www.isi.edu/natural-language/people/hovy/papers/05ACLws-MSEval.pdf> (Year: 2005).*

Filippova, Katja et al. "Dependency Tree Based Sentence Compression", 2008 Association for Computing Machinery. <https://dl.acm.org/doi/pdf/10.5555/1708322.1708329> (Year: 2008).*

Banerjee, Siddhartha et al. "Multi-Document Abstractive Summarization Using ILP based Multi-Sentence Compression", Sep. 22, 2016, AAAI Press, <https://arxiv.org/abs/1609.07034> (Year: 2016).*

Nayeem et al, Abstractive Unsupervised Multi-Document Summarization using Paraphrastic Sentence Fusion, Proceedings of the 27th International Conference on Computational Linguistics, pp. 1191-1204, Santa Fe, New Mexico, USA, Aug. 20-26, 2018.

* cited by examiner

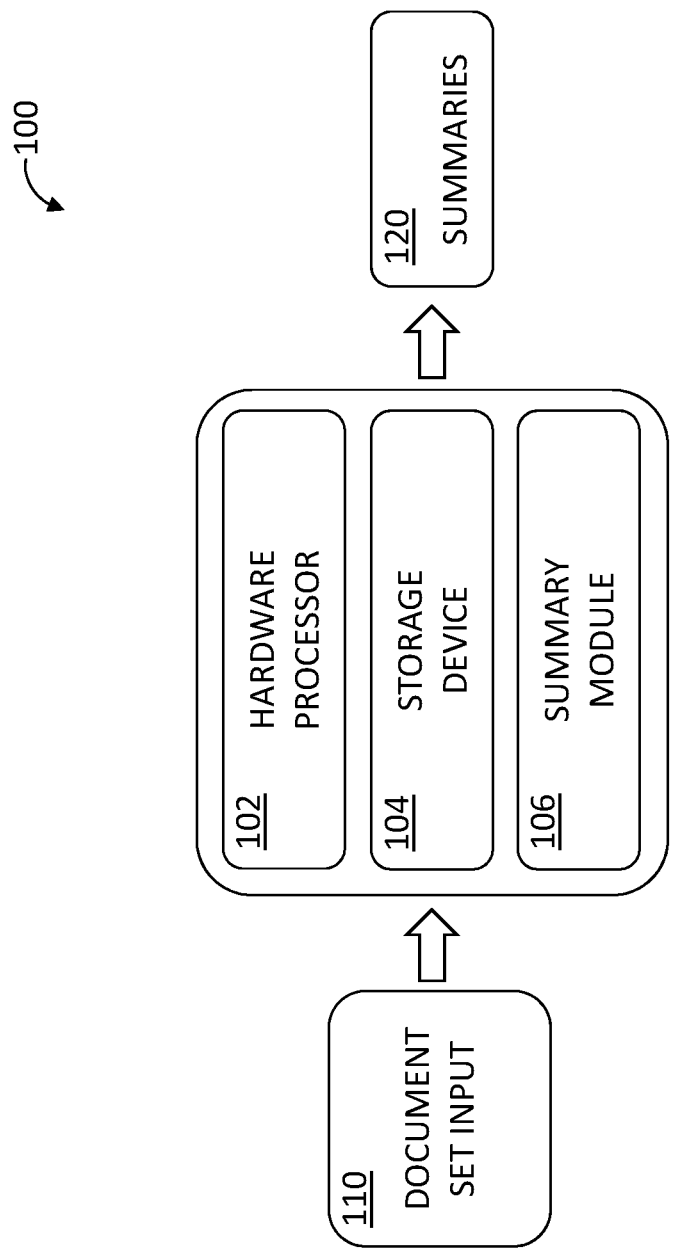

```
  ┌─────────────┐
  │ Trump Plans │
  └─────────────┘
0: ROOT
         1:(root) plans
W_token >? R    2:(nsubj) Trump
    ⇧                 3:(nn) Donald
                      3:(punct) ,
                      3:(appos) president
                              4:(det) the
                              4:(prep) of
                                      5:(pobj) States
                                              6:(det) the
                                              6:(nn) United
                3:(punct) ,
         2:(xcomp) meet
                3:(aux) to
                3:(dobj) Jong-Un
                      4:(nn) Kim
                      4:(prep) in
                              5:(pobj) Singapore
         2:(punct) ,
         2:(dep) reported
                3:(prep) in
                      4:(pobj) CNM.com
```

FIG. 4B

CONTEXT-AWARE SENTENCE COMPRESSION

BACKGROUND

The invention relates to the field of automated language processing.

The vast amounts of textual data end users need to consume motivates the need for automatic summarization of text. An automatic summarizer gets as an input one or more documents and possibly also a limit on summary length (e.g., maximum number of words). The summarizer then produces a textual summary that captures the most salient (general and informative) content parts within the input documents. Oftentimes, the summarizer may also be required to satisfy a specific information need from a user, expressed by one or more queries (e.g., summarization of web search results). Therefore, the summarization task comprises producing a summary that is both focused and includes the most relevant information.

In some cases, document summarization is aided by sentence compression. Deletion-based sentence compression aims to delete unnecessary words from source sentence to form a short sentence (compression), while remaining grammatical and faithful to the underlying meaning of the source sentence. Sentence compression has many applications, including document summarization. In this case, the objective is to shorten sentences with the aim to replace irrelevant phrases in the summary with more relevant ones.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in an embodiment, a system comprising at least one hardware processor; and a non-transitory computer-readable storage medium having stored thereon program instructions, the program instructions executable by the at least one hardware processor to: receive, as input, one or more digital documents, a query statement, and a summary length constraint, automatically identify, for each of said one or more digital documents, a sentence subset, based, at least in part, on said query statement, a modified version of said summary length constraint, and a first set of quality objectives, automatically generate, for each of said sentence subsets, a random forest representation, iteratively: (i) automatically sample, from each of said random forest representations, a plurality of tokens to create a corresponding candidate document summary, based, at least in part, on weights assigned to each of said tokens, (ii) automatically assign a quality ranking to said candidate document summary, based, at least in part, on said first set of quality objectives and a second set of quality objectives, and (iii) automatically adjust said weights, based, at least in part, on said quality rankings, and automatically output one of said candidate document summaries having a highest said quality ranking, as a compressed summary.

There is also provided, in an embodiment, a method comprising operating at least one hardware processor to: receive, as input, one or more digital documents, a query statement, and a summary length constraint, automatically identify, for each of said one or more digital documents, a sentence subset, based, at least in part, on said query statement, a modified version of said summary length constraint, and a first set of quality objectives, automatically generate, for each of said sentence subsets, a random forest representation, iteratively: (i) automatically sample, from each of said random forest representations, a plurality of tokens to create a corresponding candidate document summary, based, at least in part, on weights assigned to each of said tokens, (ii) automatically assign a quality ranking to said candidate document summary, based, at least in part, on said first set of quality objectives and a second set of quality objectives, and (iii) automatically adjust said weights, based, at least in part, on said quality rankings, and automatically output one of said candidate document summaries having a highest said quality ranking, as a compressed summary.

There is further provided, in an embodiment, a computer program product comprising a non-transitory computer-readable storage medium having program instructions embodied therewith, the program instructions executable by at least one hardware processor to: receive, as input, one or more digital documents, a query statement, and a summary length constraint; automatically identify, for each of said one or more digital documents, a sentence subset, based, at least in part, on said query statement, a modified version of said summary length constraint, and a first set of quality objectives; automatically generate, for each of said sentence subsets, a random forest representation; iteratively: (i) automatically sample, from each of said random forest representations, a plurality of tokens to create a corresponding candidate document summary, based, at least in part, on weights assigned to each of said tokens, (ii) automatically assign a quality ranking to said candidate document summary, based, at least in part, on said first set of quality objectives and a second set of quality objectives, and (iii) automatically adjust said weights, based, at least in part, on said quality rankings, and automatically output one of said candidate document summaries having a highest said quality ranking, as a compressed summary.

In some embodiments, said adjusting comprises (i) selecting a specified number of said candidate document summaries having a highest quality ranking; and (ii) adjusting said weights of said tokens included in said specified number of said candidate document summaries.

In some embodiments, steps (i), (ii), and (iii) are repeated until an average value of said quality rankings assigned to said specified number of said candidate document summaries does not improve for a specified number of consecutive iterations. In some embodiments, said specified number of consecutive iterations is between 5 and 20.

In some embodiments, said summary length constraint is expressed as a number of words. In some embodiments, said modified version of said summary length constraint is longer than said summary length constraint by between 10 percent and 30 percent.

In some embodiments, said first set of quality objectives comprises at least some of: document coverage, sentence position bias, summary length, asymmetric coverage, focus drift, summary saliency, and summary diversity.

In some embodiments, said second set of quality objectives comprises at least some of: a grammatical quality objective, a length objective, a redundancy objective, and a deleted phrase similarity objective.

In some embodiments, said selecting and said generating are each based, at least in part, on solving an optimization problem using one or more specified optimization frameworks.

In some embodiments, said optimization framework is a cross-entropy framework.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

FIG. 1 is a block diagram of an exemplary system for automated sentence compression, according to an embodiment;

FIGS. 4A-4E illustrate an exemplary token sampling process which culminates is a candidate summary, according to an embodiment.

DETAILED DESCRIPTION

Figure 2A:
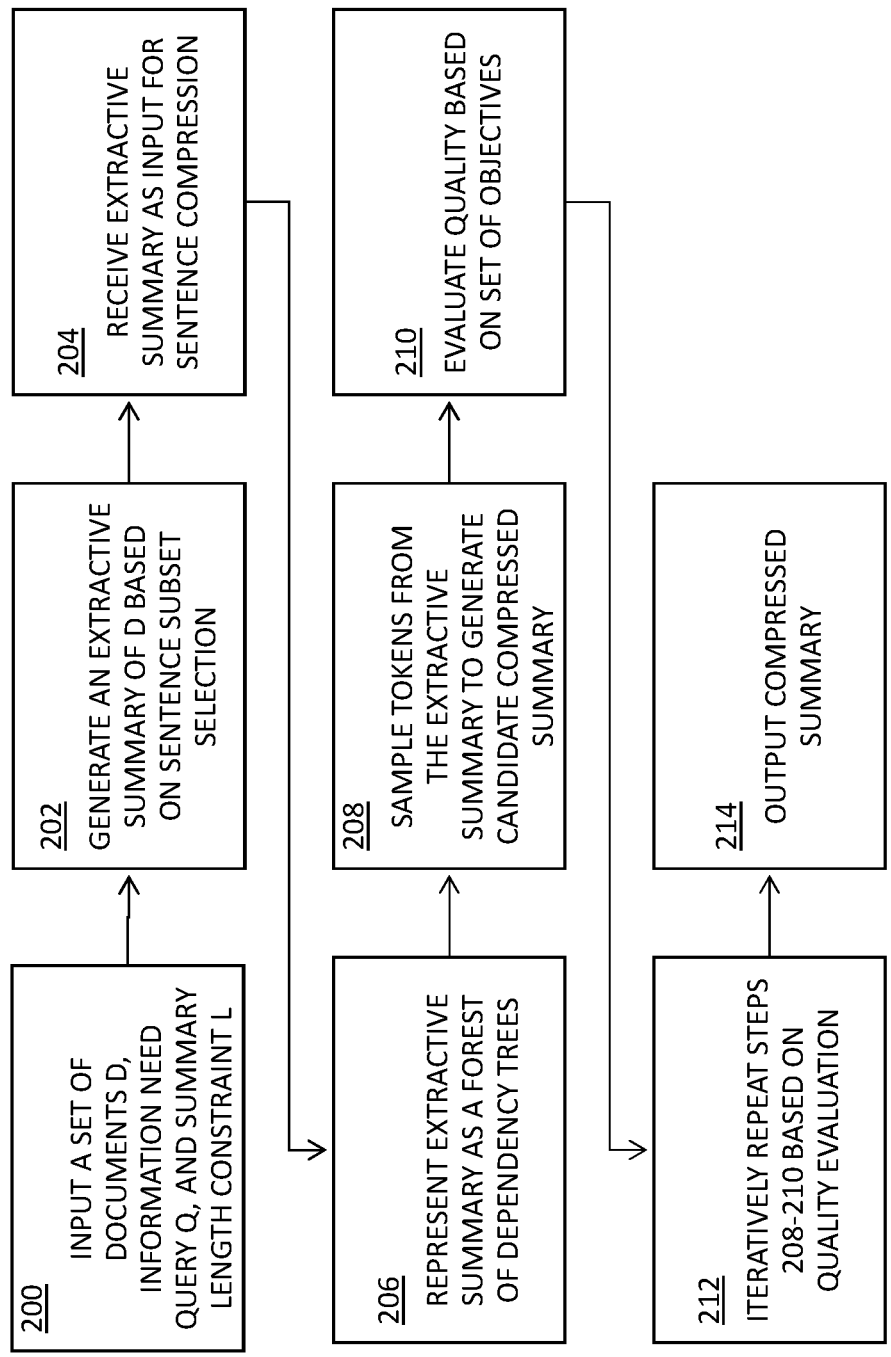
FIG. 2A is a flowchart of the functional steps in a process for automated sentence compression, according to an embodiment.

Disclosed herein are a system, method, and computer program product for automated, context-aware, unsupervised sentence compression. In some embodiments, the present disclosure provides for sentence compression within a document, which is performed simultaneously with document summarization. In some embodiments, each sentence in the document is compressed, while taking into account the information need given in a query, and the preceding sentences in the summary. In some embodiments, the present approach is effective across various domains, and requires no prior domain knowledge, training data, and/or parameter tuning.

Within the field of natural language processing (NLP), text summarization is often referred to as the task of extracting fragments of text from a corpus, which condenses the corpus to a shorter length while retaining the crux of the corpus. In the task of automated sentence compression by deletion, a computer system selects words from a sentence for deletion, so as to preserve the original meaning and grammaticality of the sentence. Formally, given an input sentence $S=w_1, w_2, \ldots, w_m$, such that $w_i$ is a word token from a vocabulary, the task is to output a new sentence $S'$ ($|S|>|S'|$) such that a subset of the words from $S$ are removed.

Sentence compression has many applications, such as document summarization. In this case, the objective is to shorten sentences with the aim to replace irrelevant phrases in the summary with more relevant ones. For instance, consider the following two sentences:

"Donald Trump, the president of the United States, plans to meet Kim Jong-Un in Singapore, reported in CNN.com."

and

"Donald Trump, the president of the United States, has softened tone toward North Korea, said Jared Kushner, a white house executive."

Traditional compression algorithms tend to, e.g., simply remove prepositions, suffixes, prefixes, and/or noun modifiers, e.g.:

"Donald Trump, the president of the United States, plans to meet Kim Jong-Un in Singapore."

and

"Donald Trump, the president of the United States, has softened tone toward North Korea."

However, when performing document summary, it may be advantageous to perform compression on each individual sentence while considering the context provided by other sentences in the summary. For example, the previous two sentences given as an exmaple contain the repeated appositive "Donald Trump, the president of the United States." A context-aware compression heuristic may be able to identify this redundancy, and provide for improved results:

"Donald Trump, the president of the United States, plans to meet Kim Jong-Un in Singapore."

and

"Donald Trump, has softened tone toward North Korea."

Accordingly, in some embodiments, the present disclosure provides for a context-aware, e.g., summary-aware, sentence compression algorithm. In some embodiments, the present context-aware sentence compression algorithm could be used in a query-focused, extractive, unsupervised document summarization. In some embodiments, the present algorithm employs a sentence compression model that helps to decide which words of a given sentence should be included in a summary, given the information need expressed in the query and the content that is already included in the summary.

A potential advantage of the present disclosure is, therefore, in that it provides for contextual sentence compression, which may reduce irrelevancy in document summarization using compression by deletion. The present disclosure may be capable of producing context-aware summarizations of single or multiple documents.

In some embodiments, the present algorithm takes into account an information need, e.g., a query, provided by a user. Assume the following query: "Report Jared Kushner's statements on the US-North Korea summit." In this case, one can argue that the last clause in the second example sentence is an important aspect and thus should be preserved in the summary:

"Donald Trump, the president of the United States, plans to meet Kim Jong-Un in Singapore."

and

"Donald Trump, the president of the United States, has softened tone toward North Korea, said Jared Kushner, a white house executive."

FIG. 1 is a block diagram of an exemplary system 100 for automated sentence compression, according to an embodiment. System 100 may comprise one or more hardware processors 102, and a non-transitory computer-readable storage device 104. System 100 as described herein is only an exemplary embodiment of the present invention, and in practice may be implemented in hardware only, software only, or a combination of both hardware and software. System 100 may have more or fewer components and modules than shown, may combine two or more of the components, or may have a different configuration or arrangement of the components. In various embodiments, system 100 may comprise one or more dedicated hardware devices, one or more software modules, and/or may form an addition to or extension to an existing device.

Storage medium 104 may have encoded thereon software instructions or components configured to operate a processing unit (also "hardware processor," "CPU," or simply "processor"), such as hardware processor(s) 102. In some embodiments, the software components may include an operating system, including various software components and/or drivers for controlling and managing general system tasks (e.g., memory management, storage device control, power management, etc.), and facilitating communication between various hardware and software components. In some embodiments, the program instructions are segmented into one or more software modules, which may comprise, e.g., a summary module 106.

Figure 2B:
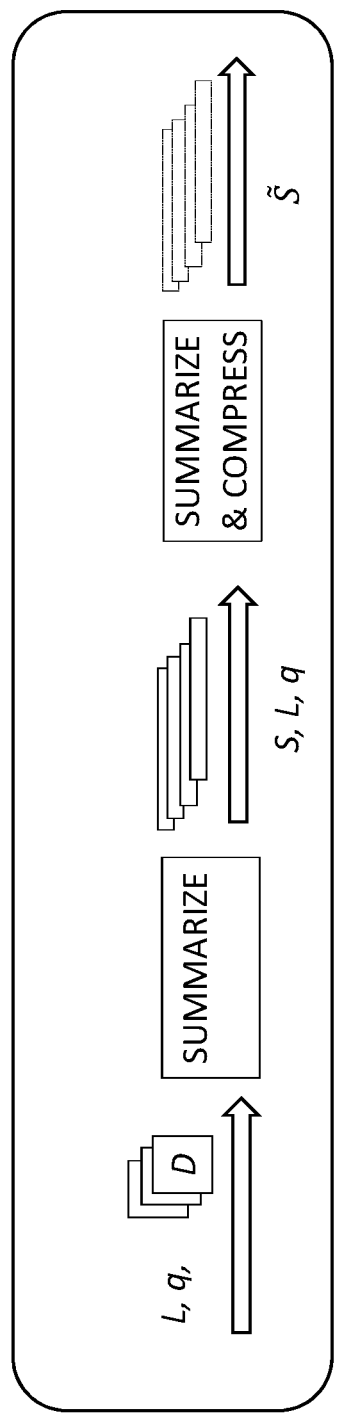
FIG. 2B schematically illustrates a process for automated sentence compression, according to an embodiment.

An overview of the functional steps in a process for automated sentence compression and document summarization is provided with continuing reference to the flowchart in FIG. 2A, and the schematic process overview on FIG. 2B.

In some embodiments, at a step 200, a denotes a given information need (query), D denotes a set of one or more matching documents to summarize, and L is a constraint on the summary length. In some embodiments, an objective of the present method is to find a query-relevant and length-compliant summary S̃ extracted from D. All of a, D, and S̃ are digitally-stored texts.

In some embodiments, the summary S̃ is generated in two steps. During, e.g., a step 202, a fully extractive summary is generated, wherein the focus is on sentences as the smallest possible extractable text units. The output of the first step 202 is then fed as input to a sentence compression process, which in turn generates a compressed, length-compliant summary. In some embodiments, to enable the compression, the present algorithm lets the output summary of step 202 to be longer than L by up to 20%.

In some embodiments, it is assumed that each document D is represented by the sequence of sentences it contains. Accordingly, the present algorithm is based on a sentence subset selection approach. Let $S_D$ denote the set of all sentences in document set D. For a given subset $S \subseteq S_D$, representing a potential summary, let len(S) denote the summary length, and let 151 denote the number of sentences in S.

In some embodiments, the summarization algorithm in the first step 202 in FIG. 1 is based on Summit, a state-of-the-art summarization architecture, as described in (i) U.S. patent application Ser. No. 16/005,815 filed Jul. 26, 2017, and (ii) Guy Feigenblat, Haggai Roitman, Odellia Boni, David Konopnicki, "Unsupervised Query-Focused Multi-Document Summarization using the Cross Entropy Method", SIGIR 2017: 961-964, incorporated herein by reference in its entirety, both of which are and incorporated herein by reference in their entirety.

In some embodiments, Summit gets as input a set of documents D (which will then be segmented into sentences $S_D$), a query a, and an upper bound on summary length L. The output is a set of sentences that represents a length-compliant summary to the query. Sentences are selected using an approach based on the Cross-Entropy method to sample from a distribution over $S_D$ iteratively. During an initialization phase, each sentence is assigned an equal uniform probability to be selected to the summary (e.g., 0.5 without loss of generality). In each iteration, Summit generates a large number of summaries (e.g., 10,000 summaries) by sampling from a distribution over $S_D$. These summaries are evaluated against a target function $Q_{CombMult}(S|q, D)$, which is combined of objectives, each measures different summary quality objective (e.g., coverage, saliency, diversity, etc.):

$$Q_{CombMult}(S|q,D) = \Pi_{i=1}^{m} Q_i(S|q,D).$$

To perform learning after each iteration, Summit utilizes the top 1% ranked summaries to adjust probability distribution of each sentence in $S_D$. Sentences that are included in many high ranked summaries (denoted as "elite sample") will have higher probability to be selected in the next iteration. The algorithm stops after the average quality of summaries in the elite sample does not change for a specified number of consecutive iterations, e.g., ten iterations. To enforce summary length, one of the objectives Summit uses penalizes summaries longer than L. Upon termination the summarizer outputs summary S.

In some embodiments, at a step 204, the sentences S that were selected in step 202, input query q, and 0 summary length upper bound L are received as input to a subsequent compression step. In some embodiments, it is assumed that the quality of the summary created in step 202 is sufficiently high, but requires further compression so that query coverage is preserved while redundancy and irrelevancy are minimized.

Accordingly, at a step 206, another summarization step may be employed, in which words are selected instead of sentences. In other words, instead of deciding if a sentence is added to the summary or not, words and sentences are sampled for inclusion. In some embodiments, a Cross-Entropy method is used for sampling and optimization.

In some embodiments, at a step 206, the extractive summary produced at step 202 is represented as a random forest of dependency or decision trees. Accordingly, in some embodiments, to keep the grammatical level of summaries high, a dependency tree structure may be used. In this structure, each word is associated with a binary grammatical relation to other words—the parent node is the governor node and the child is the dependent node. This helps to enforce that a dependent node will only be selected if its governor node is selected. For instance, the below relations represent the dependency tree of the sentence "My cat likes eating bananas." The Root node is a mock node that acts as the root of the tree and has no grammatical role:

nmod (cat—2, My—1)
nsubj (likes—3, cat—2)
root (ROOT—0, likes—3)
xcomp (likes—3, eating—4)
dobj (eating—4, banana—5)

Figure 3:
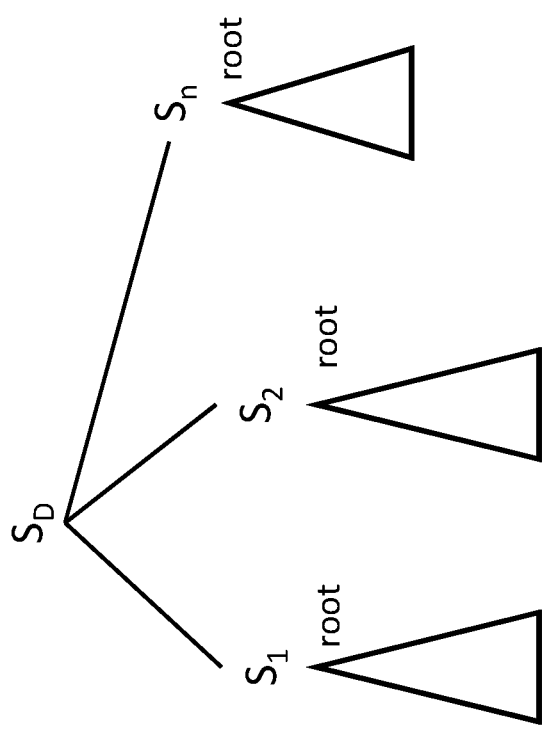
FIG. 3 schematically illustrates a random forest representation, according to an embodiment.
Figure 4A:
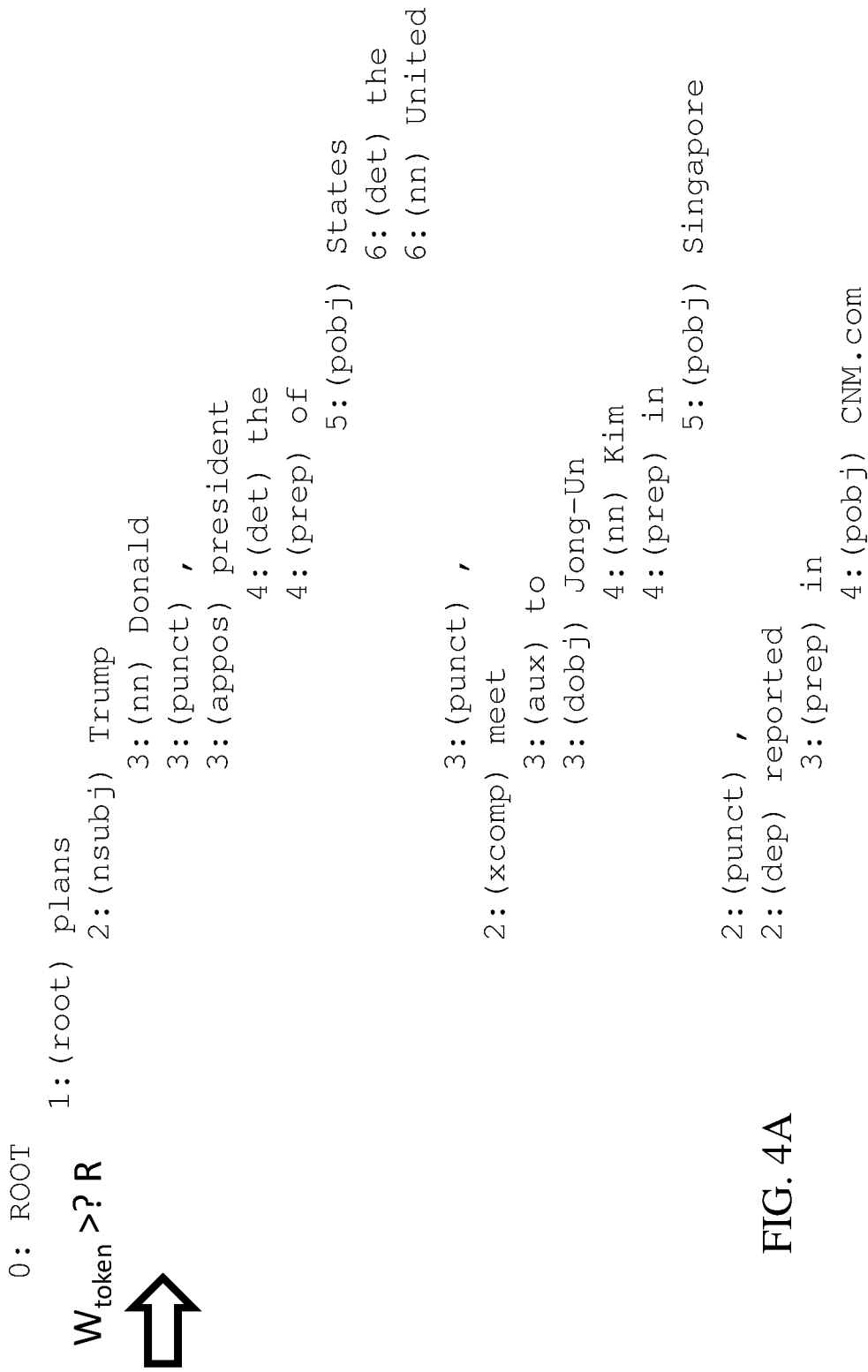
Figure 4C:
Figure 4D:
Figure 4E:

In some embodiments, the random forest decision tree representation generated at step 206 represents a concatenation of dependency trees for each individual sentence $S_i \in S_D$, connecting each local root of a sentence to the root of the random forest (global root), as illustrated in FIG. 3.

In some embodiments, at a step 208, an iterative compression process begins. In some embodiments, token sampling is carried out over the dependency tress generated in step 206.

FIGS. 4A-4E illustrate an exemplary token sampling process which culminates is a candidate summary, according to an embodiment. In some embodiments, each node in the random forest (except the global root) is initialized with a uniform weight (e.g., 0.5 without loss of generality). The sampling procedure works in an iterative manner, iterating over the direct successors of each node. If a node is selected, the procedure continues iteratively to its immediate children in the tree, otherwise, if the node isn't selected or the node is a leaf, the procedure terminates. Thus, step 208 generates a plurality of summary candidates. Eventually, for each local root (a sentence), a set of nodes are selected, wherein these nodes are the words sampled from the sentence and represent its compressed version. When a local root isn't selected, it indicates that some sentence $S_i$ isn't selected for the compressed summary.

In some embodiments, at a step 210, the quality of each candidate summary generated in step 208 is evaluated. In some embodiments, the same target function as in step 202 is used, $Q_{CombMult}$ (S|q, D), with additional objectives $Q_i$ as follows:

Grammatical Objective: This objective counts the number of ungrammatical phrases in the summary. In some embodiments, a known grammar heuristics may be used (see, e.g., Clarke, James & Mirella Lapata (2008), "Global inference for sentence compression: An integer linear programming approach", Journal of Artificial Intelligence Research, 31:399-429). For instance, a determiner and/or a numeric modifier should only be included if its governor node is included.

Length Objective: This objective penalizes sentences that were compressed too much or not as well. In some embodiments, a Gaussian may be used on the summary ratio with $\mu=0.7$.

Redundancy: This objective measures the redundancy between a given sentence to the rest of the sentences in the summary (e.g., using a pairwise Jaccard similarity).

Deleted Phrases Similarity: This objective measures the inverse similarity of the deleted phrases in all sentences to the query and penalizes if a relevant context is removed.

At a step 212, an iterative process may take place wherein steps 208-210 are repeated iteratively by, e.g., using a top specified number (e.g., 1-5%) of summaries ranked in step 210 to adjust a probability distribution of each sampled token. Accordingly, tokens that are included in many high ranked summaries (denoted as "elite sample") will have higher probability to be selected in the next iteration. The algorithm may stop after the average quality of summaries in the elite sample does not change for a specified number of consecutive iterations, e.g., ten iterations. To enforce summary length, one of the objectives the algorithm uses penalizes summaries longer than L. Upon termination, the algorithm outputs compressed summary $\tilde{S}$.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
   at least one hardware processor; and
   a non-transitory computer-readable storage medium having stored thereon program instructions, the program instructions executable by the at least one hardware processor to:
   receive, as input, one or more digital documents, a query statement, and a summary length constraint,
   automatically identify, for each digital document of said one or more digital documents, a sentence subset comprising multiple sentences, to produce one or more sentence subsets, respectively, wherein the automatic identification is based, at least in part, on said query statement, a modified version of said summary length constraint, and a first set of quality objectives,
   automatically generate, for each sentence subset of said one or more sentence subsets, a random forest representation, to produce one or more random forest representations, respectively,
   iteratively:
   (i) generate a plurality of candidate document summaries by automatically sampling, from said one or more random forest representations, a plurality of tokens to create each candidate document summary, based, at least in part, on weights assigned to each of said tokens,
   (ii) automatically assign a quality ranking to each candidate document summary, based, at least in part, on said first set of quality objectives and a second set of quality objectives, and
   (iii) automatically adjust said weights, based, at least in part, on said quality rankings,
   wherein the iterating is performed until an average value of said quality rankings does not improve for a specified number of consecutive iterations, and
   automatically output one of said candidate document summaries having a highest said quality ranking, as a compressed summary.

2. The system of claim 1, wherein said adjusting comprises:
   (a) selecting a specified number of said candidate document summaries having a highest quality ranking; and
   (b) adjusting said weights of said tokens included in said specified number of said candidate document summaries.

3. The system of claim 2, wherein said specified number of consecutive iterations is between 5 and 20.

4. The system of claim 1, wherein said summary length constraint is expressed as a number of words, and wherein said modified version of said summary length constraint is longer than said summary length constraint by between 10 percent and 30 percent.

5. The system of claim 1, wherein:
   said first set of quality objectives comprises at least some of: document coverage, sentence position bias, summary length, asymmetric coverage, focus drift, summary saliency, and summary diversity; and
   said second set of quality objectives comprises at least some of: a grammatical quality objective, a length objective, a redundancy objective, and a deleted phrase similarity objective.

6. The system of claim 5, wherein said second set of quality objectives comprises at least one of:
   said redundancy objective, which is to minimize redundancy between each sentence in the respective subset and all other sentences in the respective subset; and
   said deleted phrase similarity objective, which is to minimize a penalty given to each sentence from which a phrase similar to the query was deleted.

7. The system of claim 1, wherein said identifying is based, at least in part, on solving an optimization problem using one or more specified optimization frameworks, and wherein said optimization framework is a cross-entropy framework.

8. A method comprising:
   operating at least one hardware processor to:
   receive, as input, one or more digital documents, a query statement, and a summary length constraint,
   automatically identify, for each digital document of said one or more digital documents, a sentence subset comprising multiple sentences, to produce one or more sentence subsets, respectively, wherein the automatic identification is based, at least in part, on said query statement, a modified version of said summary length constraint, and a first set of quality objectives, automatically generate, for each sentence subset of said one or more sentence subsets, a random forest representation, to produce one or more random forest representations, respectively, iteratively:
(i) generate a plurality of candidate document summaries by automatically sampling, from said one or more random forest representations, a plurality of tokens to create each candidate document summary, based, at least in part, on weights assigned to each of said tokens,
(ii) automatically assign a quality ranking to each candidate document summary, based, at least in part, on said first set of quality objectives and a second set of quality objectives, and
(iii) automatically adjust said weights, based, at least in part, on said quality rankings,
wherein the iterating is performed until an average value of said quality rankings does not improve for a specified number of consecutive iterations, and
automatically output one of said candidate document summaries having a highest said quality ranking, as a compressed summary.

9. The method of claim 8, wherein said adjusting comprises:
(a) selecting a specified number of said candidate document summaries having a highest quality ranking; and
(b) adjusting said weights of said tokens included in said specified number of said candidate document summaries.

10. The method of claim 9, wherein said specified number of consecutive iterations is between 5 and 20.

11. The method of claim 8, wherein said summary length constraint is expressed as a number of words, and wherein said modified version of said summary length constraint is longer than said summary length constraint by between 10 percent and 30 percent.

12. The method of claim 8, wherein:
said first set of quality objectives comprises at least some of: document coverage, sentence position bias, summary length, asymmetric coverage, focus drift, summary saliency, and summary diversity; and
said second set of quality objectives comprises at least some of: a grammatical quality objective, a length objective, a redundancy objective, and a deleted phrase similarity objective.

13. The method of claim 12, wherein said second set of quality objectives comprises at least one of:
said redundancy objective, which is to minimize redundancy between each sentence in the respective subset and all other sentences in the respective subset; and
said deleted phrase similarity objective, which is to minimize a penalty given to each sentence from which a phrase similar to the query was deleted.

14. The method of claim 8, wherein said identifying is based, at least in part, on solving an optimization problem using one or more specified optimization frameworks, and wherein said optimization framework is a cross-entropy framework.

15. A computer program product comprising a non-transitory computer-readable storage medium having program instructions embodied therewith, the program instructions executable by at least one hardware processor to:

receive, as input, one or more digital documents, a query statement, and a summary length constraint;

automatically identify, for each digital document of said one or more digital documents, a sentence subset comprising multiple sentences, to produce one or more sentence subsets, respectively, wherein the automatic identification is based, at least in part, on said query statement, a modified version of said summary length constraint, and a first set of quality objectives;

automatically generate, for each sentence subset of said one or more sentence subsets, a random forest representation, to produce one or more random forest representations, respectively, iteratively:
(i) generate a plurality of candidate document summaries by automatically sampling, from said one or more random forest representations, a plurality of tokens to create each candidate document summary, based, at least in part, on weights assigned to each of said tokens,
(ii) automatically assign a quality ranking to each candidate document summary, based, at least in part, on said first set of quality objectives and a second set of quality objectives, and
(iii) automatically adjust said weights, based, at least in part, on said quality rankings,
wherein the iterating is performed until an average value of said quality rankings does not improve for a specified number of consecutive iterations, and
automatically output one of said candidate document summaries having a highest said quality ranking, as a compressed summary.

16. The computer program product of claim 15, wherein said adjusting comprises:
(a) selecting a specified number of said candidate document summaries having a highest quality ranking; and
(b) adjusting said weights of said tokens included in said specified number of said candidate document summaries.

17. The computer program product of claim 16, wherein said specified number of consecutive iterations is between 5 and 20.

18. The computer program product of claim 15, wherein said summary length constraint is expressed as a number of words, and wherein said modified version of said summary length constraint is longer than said summary length constraint by between 10 percent and 30 percent.

19. The computer program product of claim 15, wherein:
said first set of quality objectives comprises at least some of: document coverage, sentence position bias, summary length, asymmetric coverage, focus drift, summary saliency, and summary diversity; and
said second set of quality objectives comprises at least some of: a grammatical quality objective, a length objective, a redundancy objective, and a deleted phrase similarity objective.

20. The computer program product of claim 19, wherein said second set of quality objectives comprises at least one of:
said redundancy objective, which is to minimize redundancy between each sentence in the respective subset and all other sentences in the respective subset; and
said deleted phrase similarity objective, which is to minimize a penalty given to each sentence from which a phrase similar to the query was deleted.

* * * * *